April 24, 1956     E. J. HAUBER     2,742,791
OPERATING MECHANISM FOR CLUTCHES AND THE LIKE
Original Filed Jan. 10, 1947     2 Sheets-Sheet 1

INVENTOR.
ERWIN J. HAUBER
BY
ATTORNEYS

INVENTOR.
ERWIN J. HAUBER

United States Patent Office 2,742,791
Patented Apr. 24, 1956

2,742,791

OPERATING MECHANISM FOR CLUTCHES AND THE LIKE

Erwin Joseph Hauber, Brooklyn, N. Y.

Original application January 10, 1947, Serial No. 721,335, now Patent No. 2,604,788, dated July 29, 1952. Divided and this application April 15, 1952, Serial No. 282,455

3 Claims. (Cl. 74—58)

(Granted under Title 35, U. S. Code (1952), sec. 266)

The invention described herein may be manufactured and used by or for the Government of the United States of America for governmental purposes without the payment of any royalties thereon or therefor.

This invention relates to improvements in clutch mechanisms. This is a division of my copending application Serial No. 721,335, filed January 10, 1947, for Clutch Mechanism, now Patent No. 2,604,788.

The primary object is to provide clutch mechanism of simple and durable construction adapted to control rotation of a shaft.

Another object is to provide clutch mechanism operable responsive the power of a rotating shaft.

A further object is to provide novel clutch mechanism wherein the power of a rotating shaft is utilized to move a clutch operator parallel to said shaft.

Another object is to provide novel clutch mechanism operable responsive to hydraulic power.

A further object is to provide clutch mechanism adapted selectively to effect engagement and disengagement of a driving shaft from a driven shaft.

Still another object is to provide clutch mechanism adapted selectively to effect forward and reverse rotation of a driven shaft.

Further objects and advantages of this invention, as well as its construction, arrangement and operation, will be apparent from the following description and claims in connection with the accompanying drawings, in which Fig. 1 is an isometric view of a clutch mechanism partly cut away, showing a preferred embodiment of the invention;

Figure 1:
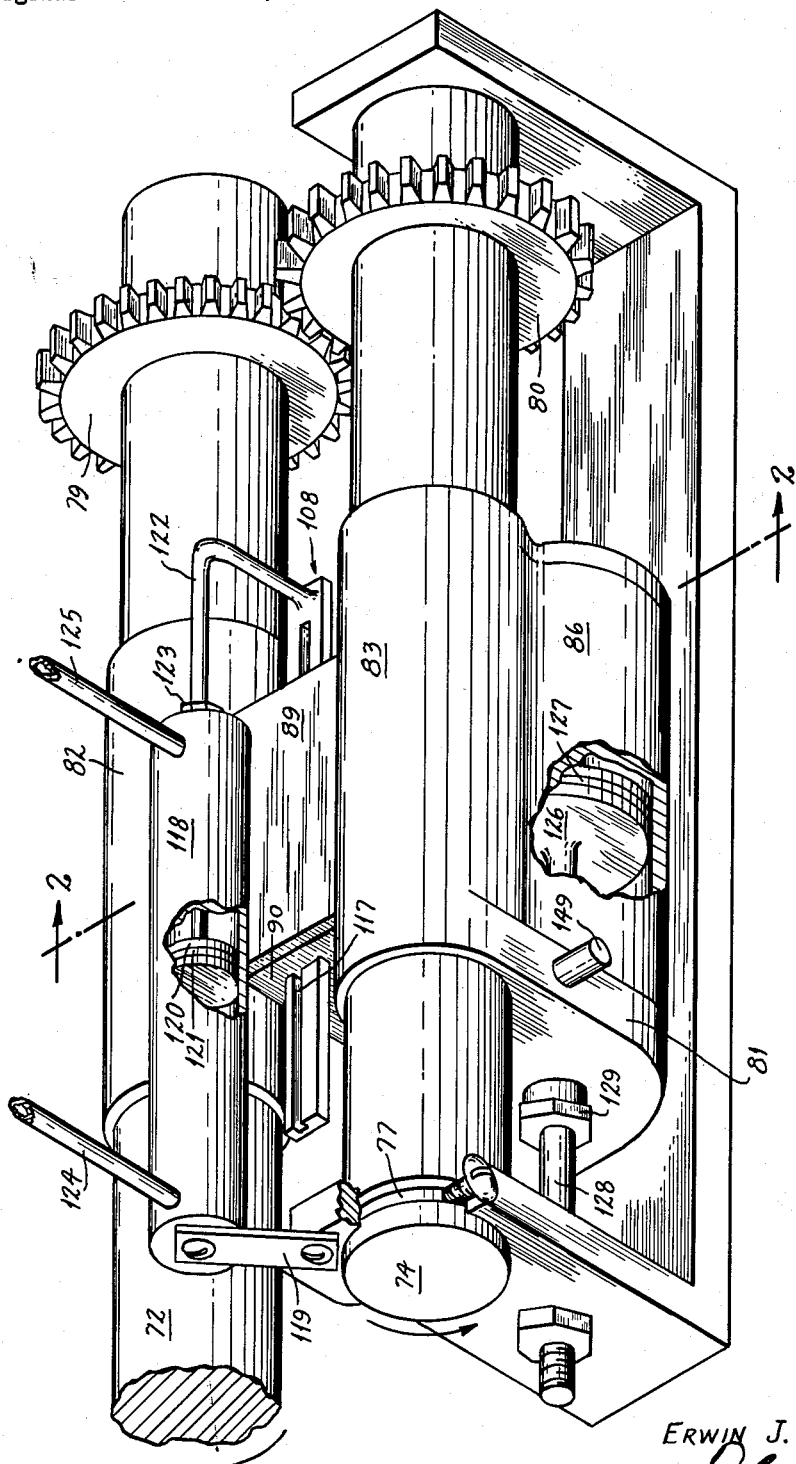

In general, the invention utilizes the driving power of a rotating shaft to move a clutch operator parallel to said shaft. The aforementioned rotating shaft can be the main or drive shaft of an engine, for example, and in the invention accordingly can be employed to actuate the engine clutch into and out of clutch engagement alternatively.

The power-driven shaft 72 can constitute the main or power shaft of an engine, for example, and pursuant to practice of the invention comprises screw threads 73 along a portion of the length thereof. A back shaft 74 is journalled in a fixed bracket 75 in position parallel with and adjacent to shaft 72. Back shaft 74 comprises a peripheral groove 77 near its end, and brackets 75 comprises set screw 76 that projects into the groove of shaft 74, thus preventing movement of the back shaft in the direction of its longitudinal axis. Shaft 74 is provided with screw threads 78, which correspond in pitch and lead to the threads 73 of main shaft 72, and are positioned adjacent thereto. The shafts 72 and 74 are coupled through gears 79 and 80, which have a ratio of 1:1, so that the shafts rotate at the same speed, but in opposite direction. Said shafts support the housing 81, hereinafter described.

Figure 2:
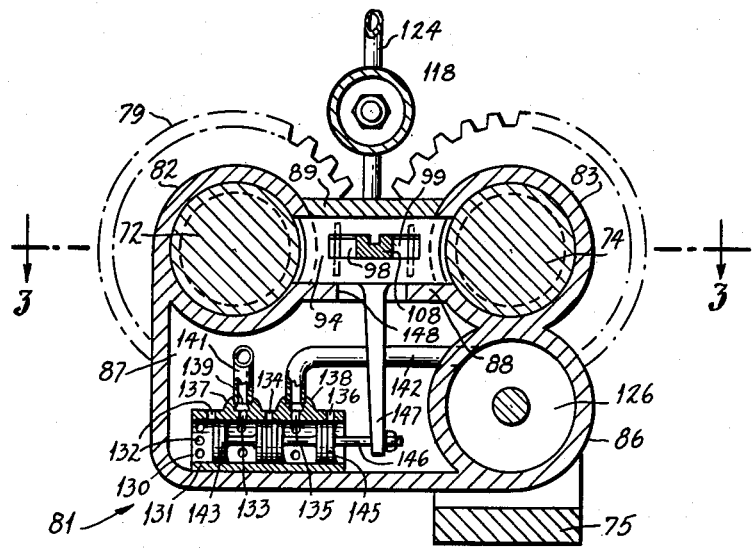
Fig. 2 is a section thereof, taken on the line 2—2 of Fig. 1.
Figure 3:
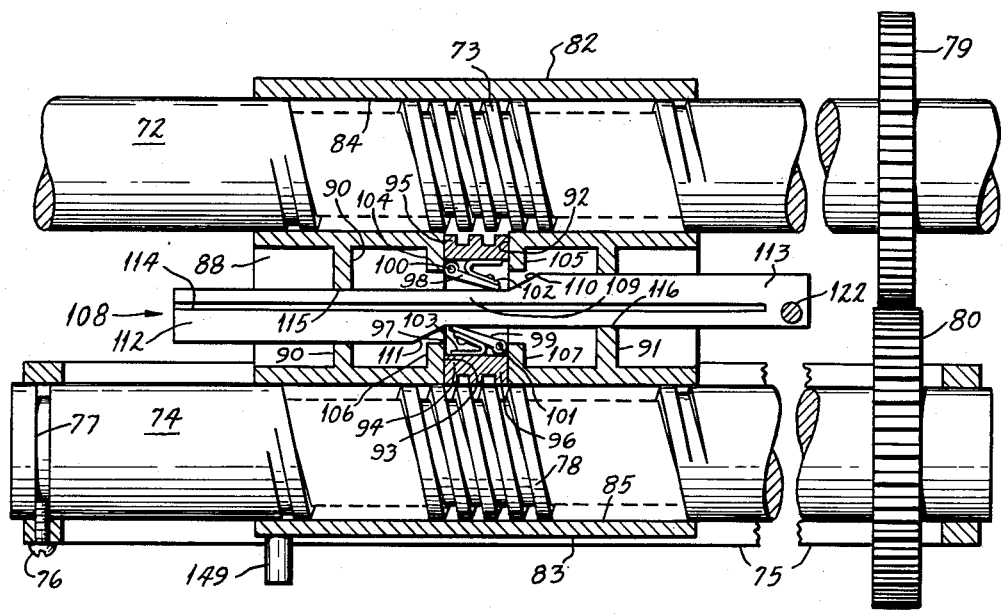
Fig. 3 is a section taken on the line 3—3 of Fig. 2.

Carriage 81 comprises sleeves 82 and 83 having cylindrical bores 84 and 85, which slide along shafts 72 and 74 respectively as seen in Fig. 3, and in which the shafts 72 and 74 are adapted to rotate. Carriage 81 constitutes a housing also, which embodies the reservoir 87, Fig. 2, and contains hydraulic cylinder 86 integral therewith and disposed below the sleeve 83.

Dog 94 is slidable on web or wall 88, which connects the sleeves 82 and 83 as seen in Fig. 2, and extends the length of carriage or housing 81. Upright webs 90 and 91 project upwardly from web 88 at points spaced apart along its length, and dog 94 operates in the space between the webs 90 and 91. Cover plate 89 is secured between the sleeves 82 and 83 above the webs 90 and 91, and encloses the space between them to contain the dog 94.

Vertical flanges 104 and 105 project upwardly from web 88 and away from sleeve 82 towards sleeve 83, and similar flanges 106 and 107 project away from sleeve 83 towards sleeve 82 and upwardly from web 88. Flanges 104 and 106 are in line with each other, as also flanges 105 and 107, to form a guideway between flanges 104 and 105 and flanges 106 and 107 for dog 94 to travel to and fro between the shafts 72 and 74. The guideway formed by flanges 104, 105, 106 and 107 extends through apertures 92 and 93 into respective sleeves 82 and 83, whereby dog 94 is enabled to move into engagement with shafts 72 and 74 alternatively.

Dog 94 is of a length permitting it to just clear each shaft when positioned therebetween. The end of the dog 94 proximate to shaft 72 is provided with teeth 95 that are threaded to mesh with the threads 73. The other end of dog 94 similarly is provided with teeth 96, which are threaded to mesh with the threads 78 on back shaft 74.

A cam bar 108 is adapted to operate the dog 94, comprises an elongated member of uniform thickness vertically in Fig. 2, and opposite end lengths 112 and 113 of uniform width, as seen in Fig. 3, which travel in guideways 115 and 116 of upright webs 90 and 91 respectively for lengthwise movement of cam bar 108. On one side of bar 108, cam 111 extends from end length 112 to the intermediate or center portion or land 109, and similarly cam 110 on the other side of bar 108 extends from end length 113 to intermediate land or portion 109. Land 109 is of reduced and uniform width. The length of intermediate portion 109 is slightly greater than the width of the dog 94 as viewed in Fig. 3. Cam surfaces 110 and 111, and land 109 between them, travel between flanges 104 and 105 on one side and opposite flanges 106 and 107 on the other.

The length of bar 108 that comprises cams 110 and 111 and the land 109 operates in rectangular aperture 97, Fig. 2, which extends through dog 94 widthwise as seen in Fig. 3. Lever 98 is contained in aperture 97 of dog 94 on one side of bar 108, and pivots on pin or fulcra 100 to extend along the bar towards its cam 110. Similarly, lever 99 also is contained in aperture 97 of dog 94 on the other side of bar 108, and is pivoted on pin or fulcra 101 to extend along the bar in the opposite direction towards its cam 111. Lever 98 is backed by leaf spring 102 secured theerto, which presses the lever against land 109 on the side of bar 108 that embodies cam 110. Similarly, lever 99 is backed by leaf spring 103 secured thereto, which presses the lever against land 109 opposed to lever 98, and on the side of bar 108 that embodies cam 111. Both springs 102 and 103 are stiff enough to actuate dog 94.

When the center portion 109 only of the bar 108 is within the opening 97, the dog 94 is centered with respect to the shafts 72 and 74 and does not engage either. When bar 108 is actuated to the right in Fig. 3, cam 111 actuates lever 99 to press dog 94 against back shaft 74. Threaded teeth 96 may not mesh immediately with thread 78, but spring 103 yields under the pressure and is flexed, and when shaft 74 rotates to position its thread 78 for meshing with teeth 96, spring 103 operates to throw dog 94 into screw-threaded engagement with shaft 74. As shaft 74 continues to rotate, dog 94 traverses along the shaft, and carriage 81 thereby travels with its sleeves 82 and 83 riding along respective shafts 72 and 74. By cam bar 108 being actuated to the left in Fig. 3, cam 110 operates to actuate lever 98 to press dog 94 against shaft 72, and spring 102 is flexed to yield under pressure until rotation of shaft 72 locates its thread 73 to mesh with teeth 95, at which time spring 102 actuates dog 94 into screw-threaded engagement with shaft 72 to be traversed, carrying with it the carriage 81.

The disclosed structure operates to actuate carriage 81 in the same direction as cam bar 108. As indicated by arrows in Fig. 1 shaft 72 rotates counterclockwise, whereas shaft 74 rotates clockwise, and threads 73 and 78 are in the same direction. With dog 95 in mesh with threads 73 of shaft 72, by operation of cam 110 when cam bar 108 is actuated to the left in Fig. 3, carriage 81 travels to the left. Carriage 81 travels to the right when it is driven by shaft 74, under operation of cam 111 when cam bar 108 is moved to the right.

An actuating device for cam bar 108, constituting a pressure fluid engine or motor, is embodied in hydraulic cylinder 118, Fig. 1, which is secured to the bracket 75 by means of a bracket 119, and supported above cover plate 89 with its longitudinal axis parallel to the cam bar 108 and to the direction of lengthwise travel of the bar. Piston 120, provided with a piston ring 121, is positioned in said cylinder and affixed to a piston rod 122, which projects through a suitable packing gland 123 in the end of the cylinder 118, and is secured to cam bar 108 at its corresponding end. Conduits 124 and 125 are connected to opposite ends of the cylinder 118, and, under control of a suitable valve as appears in Patent No. 2,604,788 of the parent application, supply pressure fluid for actuating the piston 120 selectively in opposite directions.

When piston 120 actuates cam bar 108 to press dog 94 into engagement with one or the other of the main shaft 72 or back shaft 74, by operation of either cam 110 or 111 in the manner described, pressure fluid motor of cylinder 118 continues to hold the cam bar in its position of adjustment until the control valve is operated again to operate the motor in the reverse direction, which operates to actuate the cam bar reversely and hold it. Travel of carriage 81 invariably is in the direction off of the cam 110 or 111 that initiated its movement, and onto land 109. Unbalance between springs 102 and 103 when dog 94 is actuated by cam 110 or 111 is in the direction for the more highly tensioned spring to actuate dog 94 out of screw-threaded engagement with shaft 72, or shaft 74, and to its intermediate position of Fig. 3, when the dog reaches land 109 by travel of carriage 81. Travel of carriage 81 is discontinued accordingly thereby.

Pin or lug 149, Figs. 1 and 3, projects from carriage 81, and serves as a connection for a link or the like through which movement of carriage 81 is transmitted in either direction to a member that is desired to be moved.

As appears in the specific use of the invention in the parent application of Patent No. 2,604,788, carriage 81 is actuated in opposite directions alternatively to throw the clutch of an internal combustion engine into and out of engagement alternatively. With reference to the example of the engine clutch, carriage 81 moves in one direction to engage the clutch and stops when the desired movement is completed, and moves in the other direction to disengage the clutch and stop when the desired movement is completed. In both instances, the internal combustion engine continues to operate, and its main shaft 72, as also back shaft 74, continue to rotate. A keep or holding device is provided, which also operates hydraulically, and which is embodied in cylinder 86.

Hydraulic cylinder 86 contains a piston 126 connected to a piston rod 128, which projects through the end of the cylinder and is secured in fixed position by being bolted at its end to the bracket 75, as shown in Fig. 1. Piston 126 is provided with a piston ring 127 adapted to prevent bypassing of the hydraulic fluid, and piston rod 128 passes through a suitable packing gland 129, on which the carriage 81 reciprocates.

As shown in Fig. 2, the flow of fluid into and out of the cylinder 86 is controlled by a piston valve 130 housed in the reservoir 87. This valve has a cylinder 131 provided with a plurality of circumferentially disposed sets of port 132, 133, 134, 135 and 136, spaced along the length of said valve. Ports 133 and 135 connect respectively with collecting conduits 137 and 138 formed integral with the cylinder 131 and are provided with openings 139 and 140 for conduits 141 and 142 respectively. The pistons 143, 144 and 145, which control the ports, are mounted on a common piston rod or valve stem 146 and move as a unit, and piston rings on each of the pistons serve to prevent fluid leakage. Piston 144 controls the flow of fluid through ports 134 and pistons 143 and 145 control the flow of fluid through ports 132 and 136 respectively.

It will be seen that, when the valve 130 is in the intermediate position shown in Fig. 2, no fluid can pass therethrough. However, when the pistons 143, 144 and 145 are moved away from the intermediate position in one direction, to the left for example, ports 135 connect with ports 134 between the piston 144 and 145, and ports 133 connect with ports 132 between the pistons 143 and 144, permitting a free flow of fluid between cylinder 86 on both sides of piston 126 and the reservoir 87. Conduit 141 connects ports 133 to one end of the cylinder 86, and conduit 142 connects ports 135 with the other end of said cylinder. Similarly, when valve stem 146 is moved to the right away from the intermediate position of Fig. 2, ports 133 and 134 are open to each other between the pistons 143 and 144, and ports 135 and 136 are open to each other between the pistons 144 and 145. Cylinder 86 on its end of conduit 141 is connected with reservoir 87 through ports 133 and 134, and through ports 135 and 136 on the end of conduit 142.

The piston rod 146 is bolted to an end of a bar 147, the other end of said bar being secured rigidly to the center of the lower side of the dog 94. An aperture 148 in the wall 88 is of sufficient size to permit lateral movement of the bar 147 in both directions away from the intermediate position of Fig. 2. Valve 130 is operated thereby to open condition whenever dog 94 is actuated into engagement with either shaft 72 or 74, and is closed when the dog is out of engagement with both shafts.

When dog 94 is moved to the right in Fig. 2, valve stem 146 is actuated to the right thereby, and the pistons 143, 144 and 145 are located thereby to place ports 133 in communication with ports 134 and ports 135 in communication with ports 136. This opens cylinder 86 to reservoir 87 on both sides of piston 126, Fig. 1, and frees the cylinder to move relative to its piston held stationary. Carriage 81 moves with cylinder 86, to the right in Fig. 3, and dog 94 slides along the cam bar 108 in the direction to move off of cam 111 and onto land 109, whereupon dog 94 moves out of engagement with back shaft 74 by operation of the tension of springs 102 and 103 becoming balanced and actuating dog 94 accordingly. This moves dog 94 to its position of Figs. 2 and 3, and valve stem 146 to closed position of the valve 130, sealing cylinder 86 and preventing free flow of fluid between reservoir 87 and cylinder 86 on both sides of piston 126.

Any tendency of cylinder 86 to move with reference to piston 126 is resisted and prevented by the pressure differential that is established on opposite sides of piston 126 in cylinder 86 by its movement when valve 130 is closed. Fluid thereupon flows out of the end of the cylinder 86 through conduit 141, through ports 133 and out ports 134 to the reservoir.

Various modifications and changes can be made in the device without departing from the scope of the invention.

I claim:

1. In combination with a driven shaft, a back shaft parallel with the driven shaft and driven thereby in 1:1 ratio, each of the shafts comprising a screw thread, the threads of the several shafts being adjacent each other, having the same lead and operating to traverse in opposite directions, a carriage comprising a sleeve for each shaft slidable along its length, a dog between the shafts and mounted on the carriage to travel therewith, the dog comprising oppositely disposed sets of teeth proximate to the several shafts, each set of teeth being threaded to mesh with the threads of its proximate shaft and the dog being movable relative to the carriage into and out of screw-threaded engagement with the several shafts selectively, a cam bar comprising a cam for each direction of movement of the dog relative to the carriage and a land intermediate of the cams to hold the dog out of engagement with both shafts, an actuating device to actuate the cam bar in opposite directions selectively for moving the dog into selected engagement with one or the other of the shafts and to hold the cam bar in its position of adjustment, direction of travel of the carriage by engagement of the dog with one or the other of the shafts being relative to the cam bar in the direction off of the cam that initiated its movement and onto the land, and a holding device operable by the dog engaging the land to hold the carriage against travel and to release the carriage for travel by engagement of the dog with either shaft.

2. In the combination defined in claim 1, the holding device comprising a pressure fluid engine, the carriage comprising a housing enclosing a reservoir for the engine of the holding device, a valve in the reservoir operable by the dog in position of engagement of either shaft to open the reservoir to the engine of the holding device to release the carriage for travel, the valve operating when the dog is in position of the intermediate land of the cam bar to seal the engine of the holing device from the reservoir and hold the carriage against travel.

3. Clutch-actuating mechanism comprising a first threaded shaft element and a second threaded shaft element, a housing movable axially thereon, thread-engaging elements adapted respectively to engage said shaft elements, said thread-engaging elements being controlled by a cam bar for movement parallel to said shaft elements so that said thread-engaging elements are held out of contact with said shaft elements by said cam bar in one position and so that one thread-engaging element engages one of said shaft elements in another position of said cam bar, so that rotation of the engaged shaft element causes axial movement of a thread engaging element and said housing until said thread engaging element reaches a portion of said cam bar that disengages it, a clutch operator actuated by said housing, and means to hold said clutch operator in position when the engaged one of said elements is released from said shaft element.

No references cited.